UNITED STATES PATENT OFFICE.

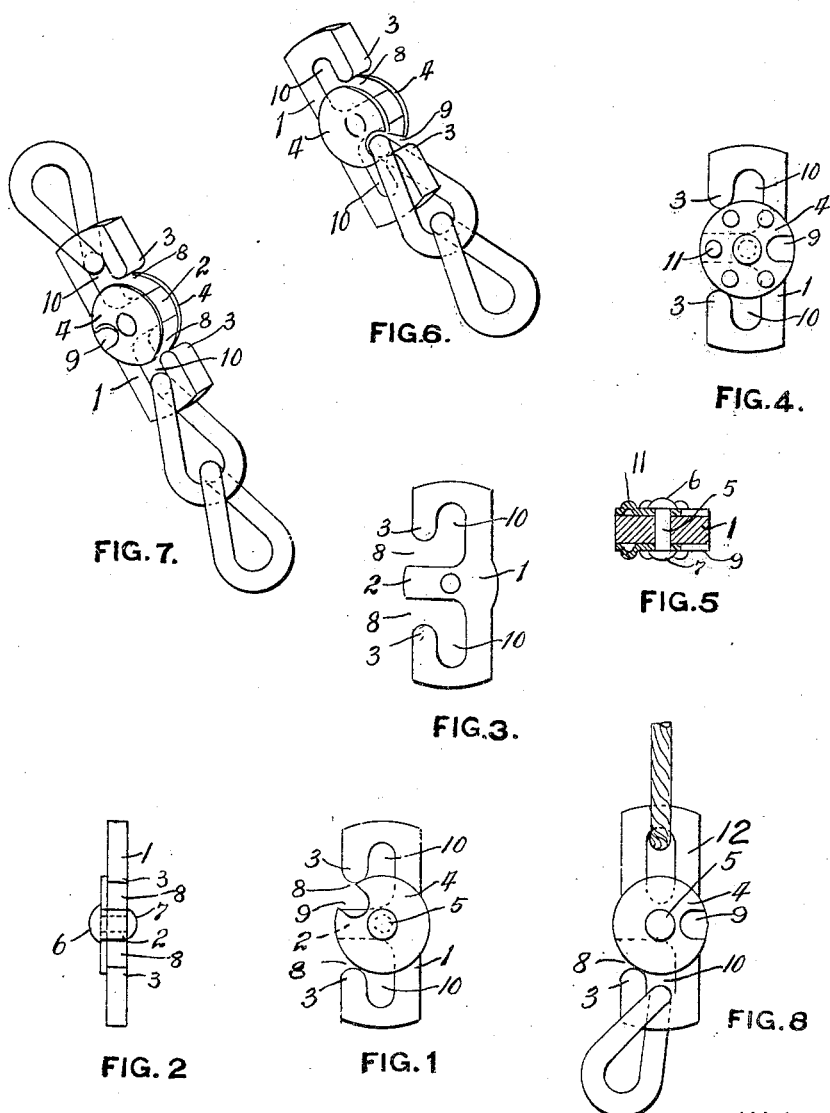

ALLEN A. TIRRILL, OF PITTSBURGH, PENNSYLVANIA.

CONNECTING-LINK.

1,380,124.  Specification of Letters Patent.  Patented May 31, 1921.

Application filed April 20, 1920. Serial No. 375,329.

*To all whom it may concern:*

Be it known that I, ALLEN A. TIRRILL, a citizen of the United States, and resident of Pittsburgh, in the county of Allegheny and State of Pennsylvania, have invented a new and useful Improvement in Connecting-Links, of which the following is a specification.

This invention relates to a connecting link for chains. This connecting link is suitable for use in mending automobile tire chains, in mending or attaching chains for porch swings or the like; and in general, for any use in which chains are to be connected, or a chain is to be attached to an article. The connecting link may be made of such size and strength as to adapt it to any particular use.

For all the purposes above mentioned, it is essential that the connecting link should be of such nature that it cannot be pulled or shaken loose after it has been attached. For use in mending automobile tire chains, it is also essential that the connecting link should be easy to attach, should receive and securely retain chain links irrespective of the degree to which such links are worn, should be resistant to wear, and should be simple in form and inexpensive to manufacture.

The object of the invention is to provide a connecting link having the above enumerated advantages.

In the accompanying drawings Figure 1 is a plan view of the connecting link; Fig. 2 is a side elevation of a device provided with one tumbler only; Fig. 3 is a plan view of the body or link member of the device; Fig. 4 is a plan view of the connecting link illustrating a modified form of tumbler; Fig. 5 is a section through such modified form of tumbler; Fig. 6 is a perspective view of the connecting link illustrating the position of the tumblers in attaching the connecting link to or detaching it from the link of a chain; Fig. 7 is a perspective view of the connecting link showing two chain links in position therein, and Fig. 8 shows a modified form of the device adapted to engage with one chain only.

The connecting link comprises a body or link member 1, having a central portion 2 and a pair of hooked arms 3 the extremities of which extend inwardly toward the central portion 2. As illustrated in Fig. 1 of the drawings, a pair of disks or tumblers 4 are mounted on a post 5 which passes through the central portion 2 of the body member. The tumblers 4 are on opposite sides of the body member, and are loosely mounted on post 5 so that they are readily rotatable in the same or in opposite directions thereon. As shown, the post 5 is in the form of a rivet having heads 6 and 7 which lie beyond the outer faces of the tumblers 4.

Tumblers 4 are preferably in the form of plates or disks of such extent that they completely close the openings 8 between the central portion 2 of the body member and the extremities of the arms 3. Each tumbler is provided with a notch 9, which is made of sufficient depth to receive any chain link which the openings 8 and the spaces 10 within the arms 3, are of sufficient extent to accommodate.

To attach the connecting link and a chain link, the notches 9 of both tumblers 4 are brought into register with one of the openings 8 between the extremities of arms 3 and the central portion of the body member. The chain link to be secured is then inserted into the notches and both tumblers are rotated until the chain link lies within that one of the spaces 10 to which the opening leads. The tumblers are then rotated (preferably in opposite directions) to lock the chain link in the space 10.

In order to disengage the links, the notches 9 are brought into register adjacent a space 10, and the chain link caused to enter the notches, as illustrated in Fig. 4 of the drawings. Movement of either the connecting link, the chain link, or the tumbler in the proper direction will then cause the chain link to be carried out through the opening 8 in the body member.

When the connecting link is employed to join chains of any usual degree of tautness, or as an attaching member, there is obviously no possibility of accidental disengagement of the connecting link and any chain link with which it may have been connected. Even though the device be used in connecting loose chains subjected to severe agitation, the chance that the notches of the two tumblers be brought into register with each other, and in position to carry the chain link through the opening in the body member, is practically negligible.

The form of the device illustrated in Fig. 2 of the drawings embodies a single tumbler only, the rivet head 7 in this instance bearing directly against the body member. Although the double tumbler form of the device is preferred as giving greater assurance against accidental disengagement, the chance for such accidental disengagement is extremely slight even though but one tumbler be employed.

When used as an attaching or repair link in automobile tire chains, the rivet heads 6 and 7 are the portions of the device which are most susceptible to wear under long continued use. In order to prolong the life of the connecting link, the modified form of tumbler illustrated in Figs. 4 and 5 of the drawings is preferably employed when the connecting link is designed for use of this character. In such modification, the rivet heads are surrounded by a plurality of protecting bosses 11. It is apparent that these bosses must be worn down to the level of the tumbler disks before the rivet head securing the tumbler in position may be completely destroyed. Protecting means other than such bosses may be obviously employed, but the bosses are preferable as they may readily be formed in the same punching operation by which the tumblers are made.

The modification illustrated in Fig. 8 of the drawings is arranged for attachment to one chain link only, and is thus provided with but one hook arm 3. The other arm is shown as extended inwardly and joined directly to the central portion 2 of the body member 1 to form an eye 12 to which a cord or other similar means may be attached.

It will be readily understood that the modifications illustrated in Figs. 4, 5 and 8 of the drawings may be embodied in the single tumbler form of the device equally as well as in the double tumbler form.

It has been found that devices previously employed for repairing automobile tire chains, have presented the great disadvantage that they were extremely apt to become wholly or partially unfastened under the severe agitation to which such chains are subjected in use. If wholly unfastened the repair link is lost; while if partially unfastened, the arms of the repair link cut into and severely injure the tire to which the chain is attached. When used as a repair link, the device of the present invention completely obviates such difficulties.

As the device is susceptible of a number of modifications without departing from the spirit of the invention, no limitations other than those contained in the appended claims are to be imposed. As an example of such modifications, more than two tumbler plates may obviously be employed if so desired.

What I claim is:

1. A connecting link comprising a body or link member having an opening therein, a notched tumbler plate on said body member, a headed post rotatably securing said tumbler plate on said body member, and protuberances on said tumbler plate for protecting the head of said post.

2. A connecting link comprising a body or link member having an opening therein, notched tumbler plates on opposite sides of said body member, a headed post rotatably securing said tumbler plates on said body member, and protuberances on said tumbler plates for protecting the heads of said post.

In witness whereof, I hereunto set my hand.

ALLEN A. TIRRILL.

Witnesses:
  J. M. HOLLIDAY,
  E. W. BECKER.